United States Patent
Everhard et al.

[11] Patent Number: 6,003,954
[45] Date of Patent: Dec. 21, 1999

[54] AIRCRAFT WHEEL AND BEAM KEY ATTACHMENT

[75] Inventors: Kenneth D. Everhard, Wadsworth; Edward J. Biskner, Cuyahoga Falls; Kurt Burkhalter, Akron, all of Ohio

[73] Assignee: Aircraft Braking Systems Corporation, Akron, Ohio

[21] Appl. No.: 08/917,252

[22] Filed: Aug. 25, 1997

[51] Int. Cl.⁶ .................................................. B60B 19/00
[52] U.S. Cl. ........................... 301/6.1; 301/6.2; 188/71.5; 188/71.6
[58] Field of Search ..................... 301/6.2, 6.91, 301/6.1, 6.3; 188/71.5, 18 A, 264.6, 71.6

[56] References Cited

U.S. PATENT DOCUMENTS

| | | | |
|---|---|---|---|
| 2,875,855 | 3/1959 | Albright | 188/18 A |
| 3,345,109 | 10/1967 | Peterson et al. | 301/6.1 |
| 3,836,201 | 9/1974 | Stimson et al. | 301/6.1 |
| 3,958,833 | 5/1976 | Stanton | 188/71.5 |
| 3,983,974 | 10/1976 | Dowell et al. | 188/264.6 |
| 4,018,482 | 4/1977 | Rastogi et al. | 301/6.1 |
| 4,084,857 | 4/1978 | VanderVeen | 301/6.1 |
| 4,585,096 | 4/1986 | Bok | 188/71.5 |
| 4,856,619 | 8/1989 | Peterson | 188/71.6 |
| 4,944,370 | 7/1990 | Chambers et al. | 188/71.5 |
| 5,024,297 | 6/1991 | Russell | 188/18 A |
| 5,107,968 | 4/1992 | Delpassand | 301/6.1 |
| 5,186,521 | 2/1993 | Niespodziany et al. | 301/6.91 |
| 5,199,536 | 4/1993 | Clark | 188/264.6 |
| 5,248,013 | 9/1993 | Hogue et al. | 301/6.2 |
| 5,321,876 | 6/1994 | Massing et al. | 188/71.5 |
| 5,348,122 | 9/1994 | Brundrett | 188/71.5 |
| 5,538,109 | 7/1996 | Swank | 188/264.6 |
| 5,851,056 | 12/1998 | Hyde | 301/6.91 |

*Primary Examiner*—D. Glenn Dayoan
*Assistant Examiner*—Long Bao Nguyen
*Attorney, Agent, or Firm*—Renner, Kenner, Greive, Bobak, Taylor & Weber

[57] ABSTRACT

A beam key and wheel assembly for aircraft brakes is presented. A beam key is pinned at one end to the aircraft wheel and is engaged proximate an opposite end to a pad on an outrigger flange of the wheel. The pad has a milled arcuate surface which is congruent with and nestingly receives a similar arcuate surface of a foot member. The foot has a channel formed therein on a side opposite the arcuate surface, the channel matingly receiving a base on a bottom surface of the beam key. A bolt passes through the beam key, foot, and pad on the outrigger flange to secure the elements together.

9 Claims, 4 Drawing Sheets

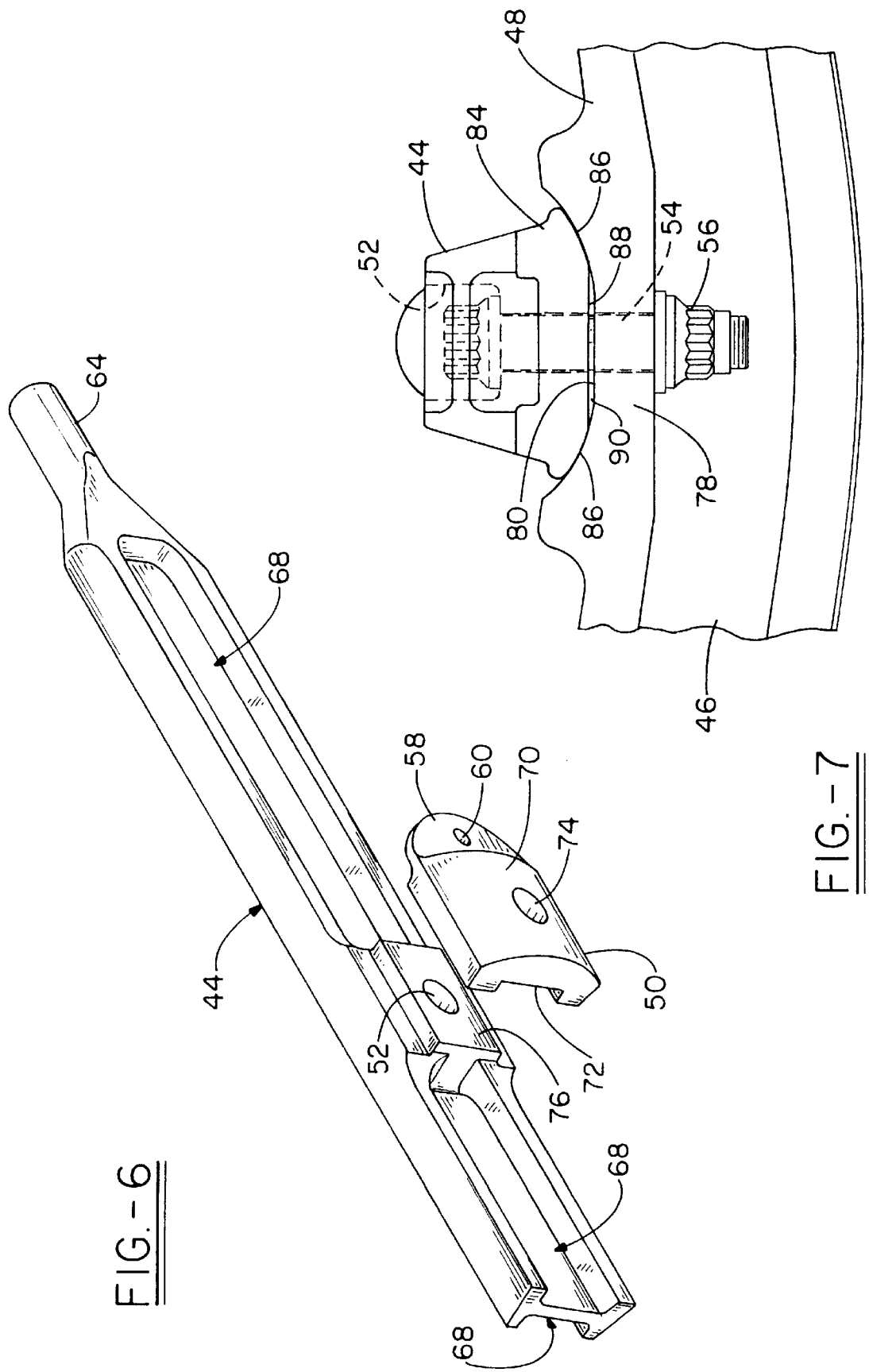

6,003,954

AIRCRAFT WHEEL AND BEAM KEY ATTACHMENT

TECHNICAL FIELD

The invention herein resides in the art of aircraft wheels and brakes. More particularly, the invention relates to an aircraft wheel assembly having a beam type key attachment, such beam key being adapted for interconnection with the rotors of a brake disk stack. More specifically, the invention relates to an aircraft wheel and beam key attachment wherein a cylindrical slot may be easily milled or bored into the wheel outrigger flange for matingly receiving a similar cylindrical surface of the beam key assembly.

BACKGROUND ART

It is well known that aircraft brakes typically employ a stack of alternatingly interleaved stator and rotor disks, such disks being adapted for selective frictional engagement with each other. The stator disks are typically splined to the axle of the aircraft, while the rotors are keyed to the wheel. As is known in the art, a series of beam keys are circumferentially spaced about an inner portion of the wheel and engage key slots in the outer circumferential surface of the rotors. The beam keys typically have one end thereof pinned to the wheel, and an opposite end mounted to an outrigger flange of the wheel. As shown in FIG. 1, a beam key and wheel assembly in accordance with the prior art is designated by the numeral 10. Here, a beam key 12 is mounted upon a foot 14 which in turn is engaged to an outrigger flange 16 of the wheel 18. A nut and bolt assembly 20 attains the secured engagement of the beam key 12, foot 14, and outrigger flange 16. The bolt of the nut and bolt assembly 10 is a shear bolt. Typically, a thermal insulator 22 is interposed between the foot 14 and the outrigger flange 16 to minimize the transfer of heat from the heat sink of the brake disk stack to outrigger flange 16.

Another prior art beam key and wheel assembly is illustrated in FIG. 2 and designated generally by the numeral 28. In this embodiment, the beam key 30 is received upon a foot 32 which is maintained in a channel 34 which is milled from the outrigger flange 36 of the wheel 38. A nut and bolt assembly 40 is again provided for purposes of securing the beam key 30, foot 32, and outrigger flange 36 together. The bolt of the nut and bolt assembly 40 is preferably a shear bolt.

In the beam key and wheel assembly 10 of FIG. 1, the beam key 12 has a rather wide flange to provide a reaction to the overturning moment to which it is subjected in operation. In beam key and wheel assembly 28 of FIG. 2, a similar wide flange is used to react to the overturning moment, but the shear loads are first received by channel 34 milled out of the outrigger flange 36. The prior art structures of FIGS. 1 and 2 are typical in the industry. This embodiment of FIG. 2 allows a smaller diameter bolt to be used than in the embodiment of FIG. 1, since the bolt in the assembly 28 is primarily in tension rather than combined tension and shear. The channel 34 also increases the fixity at the bottom end of the key, reducing the load at the opposite "post" or pinned end of the key. In contradistinction, the assembly 10 has typically required a bushing or sacrificial member in the pinned end of the wheel. This requirement, combined with the necessity of a larger diameter nut and bolt assembly 20 in the embodiment of FIG. 1, can make that embodiment heavier than the embodiment of FIG. 2. However, the precise machining required for the wheels employing the embodiment of FIG. 2 is time consuming and expensive. Specifically, the channel 34 must be milled out using a "stitching" technique, which is both costly and time consuming. The use of right angle milling cutters making passes to machine the slot adds significantly to the cost of manufacturing the preferred prior art embodiment of FIG. 2.

There is a need in the art for a beam key and wheel assembly which provides for the secure and force dissipating engagement between the beam key and the wheel which is attained by employing the technique and structure of FIG. 2, but which enjoys a reduction in both the time and cost to manufacture.

DISCLOSURE OF INVENTION

In light of the forgoing, it is a first aspect of the invention to provide a beam key and wheel assembly in which an arcuate surface is milled into the outrigger flange of the wheel for receipt of a beam key.

Another aspect of the invention is the provision of a beam key and wheel assembly in which a pad for receiving the beam key can be formed in the outrigger flange in a minimum of passes, providing rough milled and finished surfaces.

Still a further aspect of the invention is the provision of a beam key and wheel assembly in which the wheel machining can be attained with the mill on the same axis as the machine head.

Yet a further aspect of the invention is the provision of a beam key and wheel assembly in which a foot is interposed between the beam key and the outrigger flange, and wherein the foot has a channel receiving the beam key and an arcuate surface engaging an outrigger pad.

Still a further aspect of the invention is the provision of a beam key and wheel assembly in which a foot is provided with a tab adapted for receiving a heat shield interposed between the brake disk stack and the wheel structure.

Yet a further aspect of the invention is the provision of a beam key and wheel assembly which is reliable and durable in operation and given to ease of manufacture using state of the art techniques.

The foregoing and other aspects of the invention which will become apparent as the detailed description proceeds are achieved by an aircraft wheel and beam key assembly, comprising: a wheel having an outrigger flange about an outer circumference thereof and a bore in an inner circumference thereof; a beam key having a pin at an end thereof, said pin being received by said bore; and a foot interposed between said beam key and said outrigger flange, said foot being nestingly received by said outrigger flange and matingly receiving said beam key.

Other aspects of the invention which will become apparent herein are achieved by an aircraft wheel and beam key assembly, comprising: a beam key having a pin at one end thereof; a wheel having a bore therein receiving said pin; and an outrigger flange about a circumference of said wheel, said flange having a curvate housed-out pad lockingly receiving said beam key proximate an end of said beam key opposite said pin.

DESCRIPTION OF THE DRAWINGS

For a complete understanding of the objects, techniques, and structure of the invention reference should be made to the following detailed description and accompanying drawings wherein:

FIG. 6 is a perspective view of the beam key and foot according to the invention; and FIG. 7 is an end view of a modified beam key and wheel assembly according to the invention.

BEST MODE FOR CARRYING OUT THE INVENTION

Figure 1:
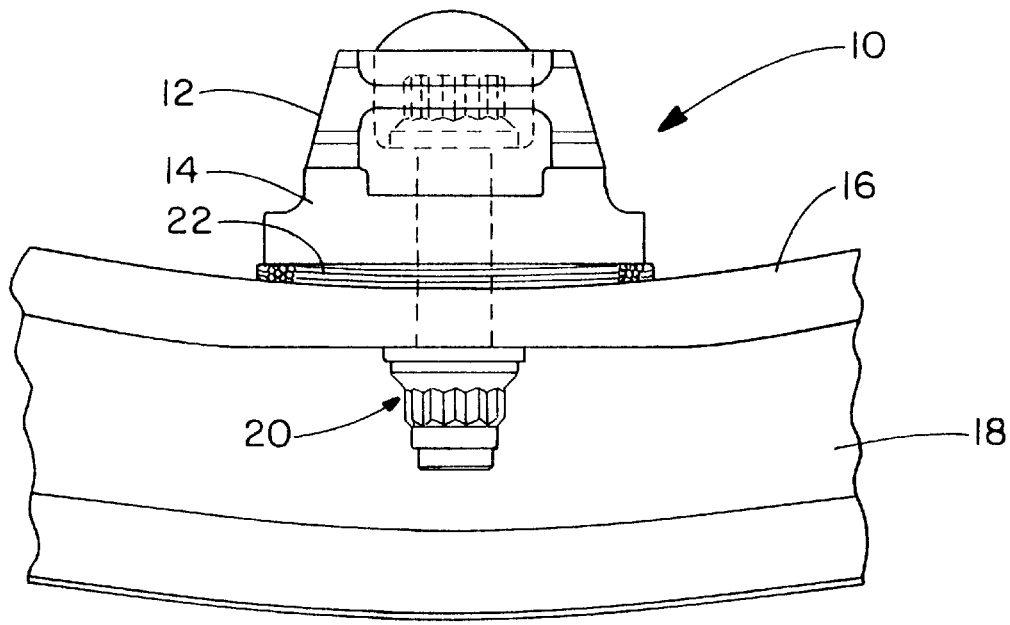
FIG. 1 is a partial sectional view of a beam key and wheel assembly in accordance with the prior art.
Figure 2:
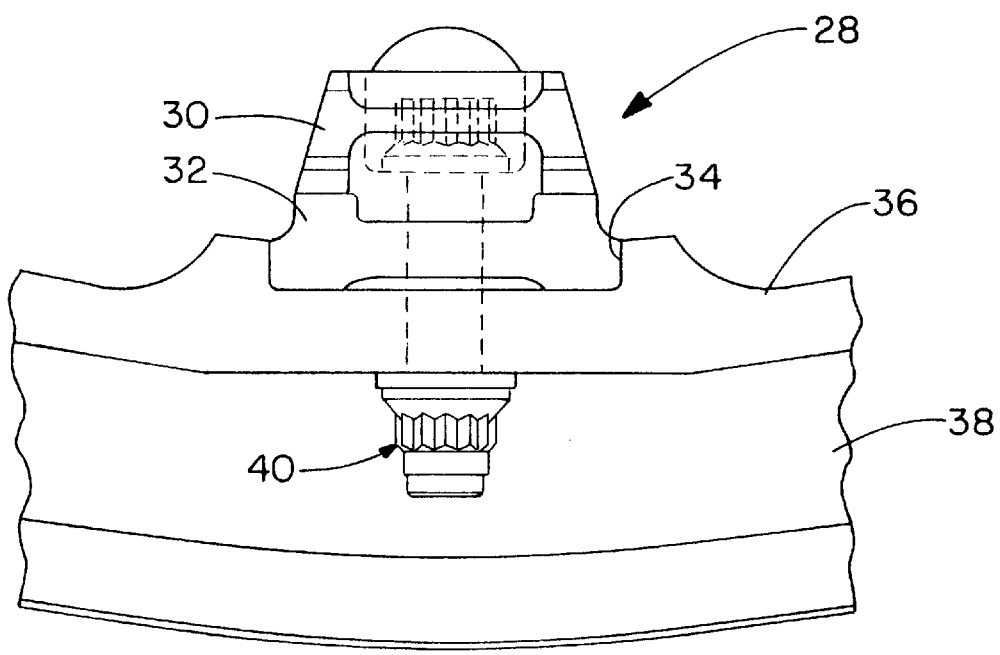
FIG. 2 is a partial sectional view of a beam key and wheel assembly made in accordance with another embodiment of the prior art.
Figure 3:
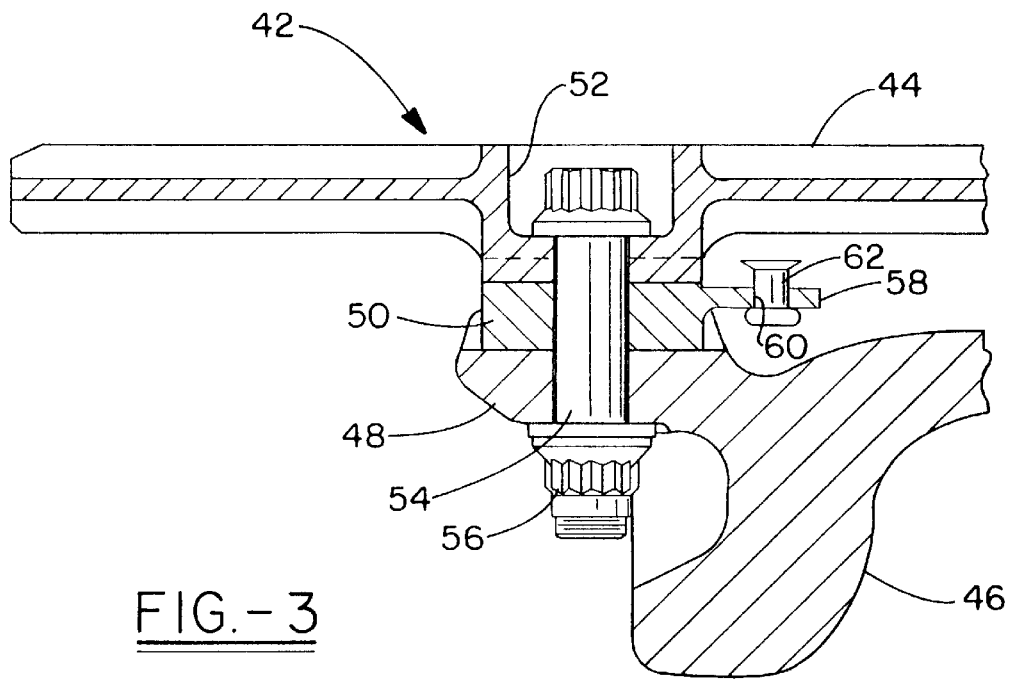
FIG. 3 is a partial cross sectional view of a beam key and wheel assembly according to the invention, and particularly showing the outrigger flange and beam key interconnection.
Figure 5:
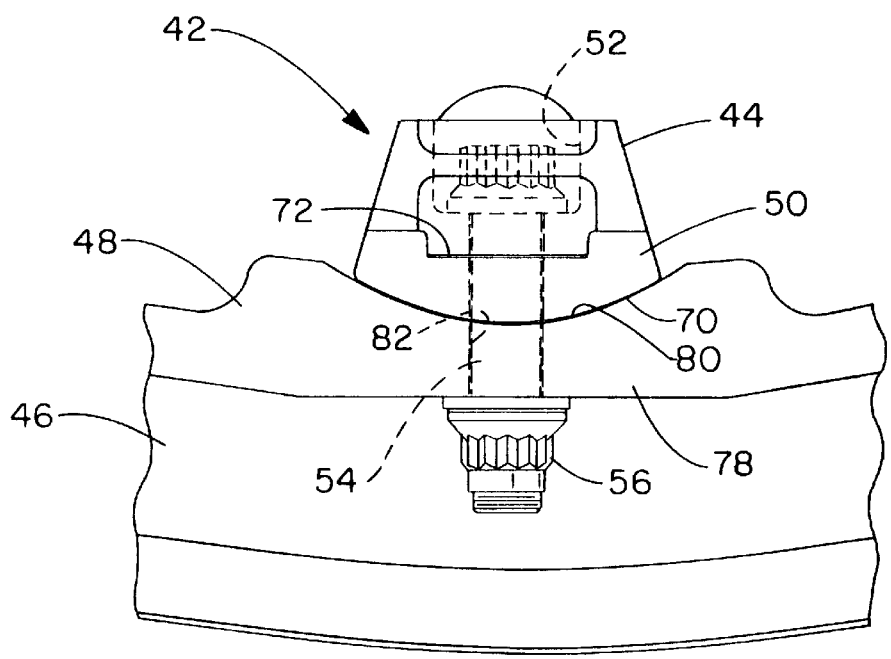
FIG. 5 is a partial front elevational view of the beam key and wheel assembly of FIGS. 3 and 4.
Figure 4:
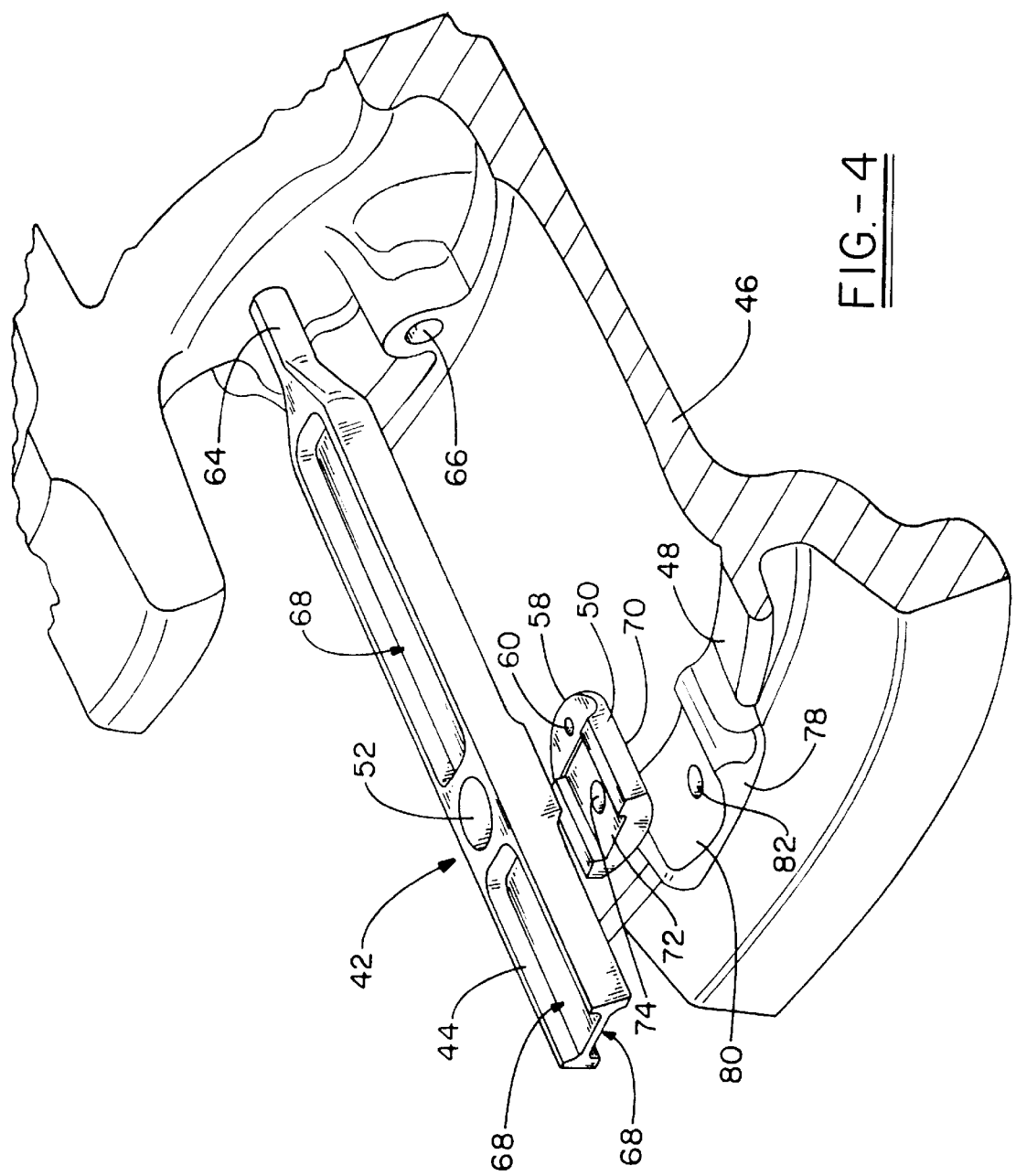
FIG. 4 is an assembly illustration of the beam key and wheel assembly according to the invention, showing a partial section of the wheel assembly.

With reference now to FIGS. 3, 4 and 5, it can be seen that a beam key and wheel assembly made in accordance with the invention is designated generally by the numeral 42. Here, a beam key 44 is adapted for interconnection with an aircraft wheel 46 by attachment to the wheel's outrigger flange 48. A foot 50 is interposed between the beam key 44 and the outrigger flange 48, as shown. A through counterbore 52 is provided in a top surface of the beam key 44 and is adapted for receiving a bolt 54 which is secured beneath the outrigger flange 48 by a nut 56. As will become apparent later herein, the beam key 44 lockingly engages in a channel of the foot 50, with the foot 50 being nestingly received by a slot 80 milled into the outrigger flange 48.

The foot 50 is characterized by a tab 58 extending from a rear end thereof inwardly toward the interior of the wheel 46. An aperture 60 is provided in the tab 58 and is adapted for receiving a rivet 62 or other appropriate fastener for securing a heat shield thereto. It will be appreciated that with a plurality of uniformly spaced beam keys 44, each with an associated foot 50, being provided about the inner-circumference of the wheel 46, a heat shield may be interposed between the wheel 46 and the brake disk stack by attachment to the tabs 58.

As presented above, one end of a beam key 44 is secured to an outer circumferential outrigger flange 48 of the wheel 46 by means of a bolt and nut assembly 54, 56. The opposite end of the beam key 44 is also secured to the wheel 46 by means of engagement of a pin or post in a bore. As best shown in FIG. 4, a pin 64 is provided at the end of the beam key 44 and is adapted for receipt in a bore 66 provided within the wheel 46. It will also be noted that the beam key 44 has portions 68 removed for purposes of reducing weight, while maintaining the strength thereof.

With particular reference to FIGS. 4 and 5, it can be seen that the foot 50 is provided with an arcuate bottom surface 70 and a channel 72 in the top surface thereof. A bore 74 passes through the foot 50 and is axially aligned with the bore 52 of the beam key 44 to receive the bolt 54. As shown in FIG. 6, a rectangular base 76 is formed on a bottom surface of the beam key 44 and is configured to be matingly received by the channel 72. It will also be appreciated that various other configurations could be employed—and the male and female portions can be interchanged.

As best shown in FIGS. 4 and 5, a pad 78 is milled from or forged in the outrigger flange 48. The pad 78 has an arcuate upper surface 80 which, in a preferred embodiment of the invention and as best shown in FIG. 5, is congruent with the arcuate surface 70 of the foot 50. A bore 82 passes through the pad 78 and is axially aligned with the bores 74, 52 to receive the bolt 54. It will be appreciated by those skilled in the art that the arcuate surface 80 may be milled or otherwise formed in the pad 78 in two passes, the first providing a rough milling of the arcuate surface 80, with the final pass providing a finished surface. Moreover, the mill providing the operation can be provided on the same axis as the machine head.

As best shown in FIG. 5, the beam key 44 is substantially trapezoidal or H-shaped in cross section, having a wider base than a top. Of course, a variety of other configurations could be employed. The base or pedestal sets upon the foot 50, with the base 76 being received within the channel 72. Accordingly, effective locking engagement is obtained between the beam key 44 and the foot 50. In like manner, the surface 70 of the foot 50 is of the same curvature as the surface 80 of the pad 78, such that full interface engagement between the foot 50 and pad 78 is attained. The clamping engagement thus achieved by bolt and nut assembly 54, 56, taken in combination with the pinned engagement of the opposite end of the beam key 44 as at 64, 66 achieves a structure of high integrity, capable of withstanding the torques and overturning moments characteristic of aircraft braking operations.

With reference to FIG. 7, it can be seen that a slight variation on the basic theme of the invention may be attained by providing the foot 84 with a pair of shoulders 86, each of which has an arcuate surface of the same curvature as surface 80 of the pad 78. However, the shoulders 86 are interconnected by a planar bottom surface 88. Accordingly, with the shoulders 86 engaging the arcuate surface 80, an air gap 90 is interposed between the planar bottom surface 88 and the arcuate surface 80, such air gap providing a degree of insulation between the heat sink of the brake disk stack and the wheel 46.

Those skilled in the art will appreciate that appropriate insulative materials can be interposed between the various elements such as between the key and foot and the foot and wheel, as desired. Insulative bushings can also be employed at the bolts. They will also appreciate that various of the elements presented herein as separate and distinct pieces could be cast, forged, or otherwise devised as single piece structures while remaining within the scope of the invention.

Thus it can be seen that the objects of the invention have been satisfied by the structure presented above. While in accordance with the patent statutes only the best mode and preferred embodiment of the invention has been presented and described in detail, the invention is not limited thereto or thereby. Accordingly, for an appreciation of the true scope and breadth of the invention reference should be made to the following claims.

What is claimed is:

1. An aircraft wheel and beam key assembly, comprising:
   a wheel having an outrigger flange about an outer circumference thereof and a bore in an inner circumference thereof;
   a beam key having a rectangular base and a pin at an end thereof, said pin being received by said bore;
   a foot interposed between said beam key and said outrigger flange, said foot being nestingly received by said outrigger flange having a channel and matingly receiving said rectangular base of said beam key;
   a pad receiving said foot, said pad being integral with said outrigger flange, said pad having an arcuate surface about an axis parallel to an axis of said wheel; and wherein said foot has a pair of shoulders separated by a planar surface, said shoulders having arcuate surfaces mating with said arcuate surface of said pad, said planar surface and said arcuate surface of said pad defining an air gap therebetween.

2. The aircraft wheel and beam key assembly according to claim 1, wherein said beam key, pad and foot have aligned bores passing therethrough, said bores receiving a bolt therethrough.

3. The aircraft wheel and beam key assembly according to claim 2, wherein said foot has a tab extending therefrom.

4. An aircraft wheel and beam key assembly, comprising:

a wheel having a pin at one end thereof;

a beam having a bore therein receiving said pin; and an outrigger flange about a circumference of said wheel, said flange having a curvate housed-out pad lockingly receiving said beam key proximate an end of said beam key opposite said pin.

5. The aircraft wheel and beam key assembly according to claim 4, further comprising a foot interposed between said beam key and said pad.

6. The aircraft wheel and beam key assembly according to claim 5, wherein said foot has a channel receiving said beam key, said foot being a curvate surface in mating engagement with said curvate surface of said pad.

7. The aircraft wheel and beam key assembly according to claim 6, wherein said curvate surface of said foot and pad are in full contact with each other.

8. The aircraft wheel and beam key assembly according to claim 6, wherein said foot has curvate shoulders in engagement with said curvate surface of said pad, said pad and foot defining an air gap between said shoulders.

9. The aircraft wheel and beam key assembly according to claim 6, wherein said beam key is substantially H-shaped in cross section.

\* \* \* \* \*